INVENTORS.
ROLF D. WEGLEIN,
DELOS T. KITTOE,
BY Paul M. Coble
ATTORNEY.

INVENTORS.
ROLF D. WEGLEIN,
DELOS T. KITTOE,
BY
Paul M. Coble
ATTORNEY.

INVENTORS.
ROLF D. WEGLEIN,
DELOS T. KITTOE,
BY Paul M. Coble
ATTORNEY

United States Patent Office 3,426,291
Patented Feb. 4, 1969

3,426,291

ARRANGEMENT UTILIZING PHASE CONDITIONED HARMONICALLY RELATED SIGNALS TO IMPROVE TRAVELING-WAVE AMPLIFIER EFFICIENCY

Rolf D. Weglein, Los Angeles, and Delos T. Kittoe, San Pedro, Calif., assignors to Hughes Aircraft Company, Culver City, Calif., a corporation of California Filed Mar. 31, 1965, Ser. No. 444,313
U.S. Cl. 330—43 20 Claims
Int. Cl. H03f 3/58, 3/68, 1/00

ABSTRACT OF THE DISCLOSURE

In the disclosed system, the harmonic content of the output from a traveling-wave amplifier capable of amplifying signals at both a fundamental frequency and a harmonic frequency is reduced by applying to the amplifier a fundamental frequency input and a preconditioned phase related harmonic frequency input. The phase conditioning is such that the amplifier develops a harmonic output component due to its harmonic input which substantially cancels the harmonic output component developed by the amplifier due to its fundamental input.

This invention relates to traveling-wave amplifiers and more particularly relates to a system for phase conditioning harmonically related input signals to a traveling-wave tube such that the power output, and hence the efficiency, of the traveling-wave tube is increased.

In traveling-wave tubes a stream of electrons is caused to interact with a propagating electromagnetic wave in a manner which amplifies the electromagnetic wave energy. In order to achieve such interaction, the electromagnetic wave is propagated along a slow-wave circuit such as a conductive helix wound about the path of the electron stream. The slow-wave circuit provides a path of propagation for the eletromagnetic wave which is considerably longer than the axial length of the circuit, and hence, the traveling-wave may be made to effectively propagate at nearly the velocity of the electron stream. Interaction between electrons in the stream and the traveling-wave causes velocity modulation and bunching of the stream electrons. The net result may then be a transfer of energy from the electron stream to the wave traveling along the slow-wave circuit.

Under small signal conditions a traveling-wave tube is a linear device in that its output signal is an amplified replica of its input signal. However, as the magnitude of the input signal is increased, the amplitude of the electromagnetic wave traveling along the slow-wave circuit and the amount of bunching of the electrons increases until a saturation point is reached at which highly dense electron bunches are produced. These dense electron bunches possess a considerable amount of energy at harmonic frequencies of the fundamental frequency being amplified, causing signals at these harmonic frequencies to appear at the traveling-wave tube output.

As the input signal amplitude is increased above the initial saturation level, saturation occurs nearer to the input end of the tube, casing harmonic signals to be generated earlier in the amplification process. For narrow bandwidth tubes in which electromagnetic waves at the harmonic frequencies are not capable of propagating along the slow-wave circuit, the harmonic content of the power output is relatively low. However, for wide bandwidth traveling-wave tubes in which the harmonic frequencies can propagate along the slow-wave circuit, interaction with the electrons, and hence amplification, can take place at these harmonic frequencies. Thus, when wide bandwidth traveling-wave tubes are operated at power levels causing saturation of the electron beam, output signals at harmonic frequencies of the fundamental frequency may be generated at power levels comparable to that of the desired fundamental output signal, thereby severely limiting the efficiency of the traveling-wave tube.

Accordingly, it is an object of the present invention to provide an arrangement for substantially increasing the power output, and hence the efficiency, of a wide bandwidth traveling-wave amplifier in the lower portion of its amplification band.

It is a further object of the present invention to provide a system for increasing the output power level from a wide bandwidth traveling-wave tube at the desired fundamental frequency while at the same time reducing the output power level at harmonic frequencies of the fundamental frequency, thereby improving the spectral purity of the traveling-wave tube output.

It is a still further object of the present invention to provide an arrangement for minimizing harmonic output signals from a wide bandwidth traveling-wave amplifier, thereby reducing harmonic distortion of the desired fundamental output signal.

It is still another object of the present invention to provide a system for reducing intermodulation distortion during multi-signal operation of a wide bandwidth traveling-wave tube.

It is a still further object of the present invention to provide a traveling-wave tube with external means for increasing the efficiency of the tube and reducing the harmonic content of the tube's output signals.

It is yet another object of the present invention to provide a system incorporating a cascaded driver traveling-wave amplifier and power traveling-wave amplifier in which harmonic output signals from the driver amplifier are advantageously utilized to reduce the harmonic content of the output from the power amplifier, thereby eliminating the necessity to design the driver amplifier for minimum harmonic power output.

In accordance with the objects set forth above, a microwave amplification system according to the present invention includes a traveling-wave amplifier capable of amplifying signals at a fundamental frequency and at a harmonic frequency of the fundamental frequency. A signal at the fundamental frequency is applied to the traveling-wave amplifier, and signal conditioning means develops and applies to the traveling-wave amplifier a signal at the harmonic frequency which has a phase related to that of the fundamental frequency signal such that an output signal component at the harmonic frequency is developed by the traveling-wave amplifier due to its harmonic frequency input signal which substantially cancels the output signal component at the harmonic frequency developed by the traveling-wave amplifier due to its fundemental frequency input signal.

Additional objects, advantages and characteristic features of the present invention will become readily apparent from the following detailed description of preferred embodiments of the invention when considered in conjunction with the accompanying drawings in which.

Figure 1:
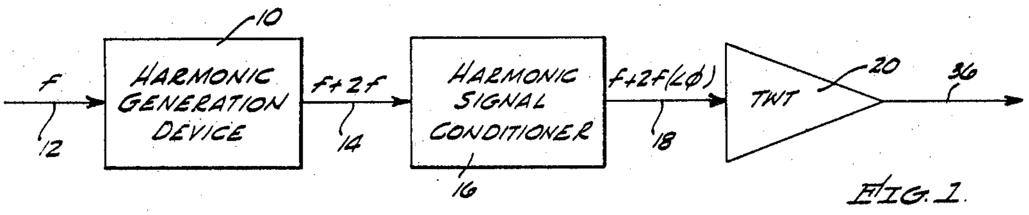
FIG. 1 is a generalized block diagram illustrating the system of the present invention.
Figure 2:
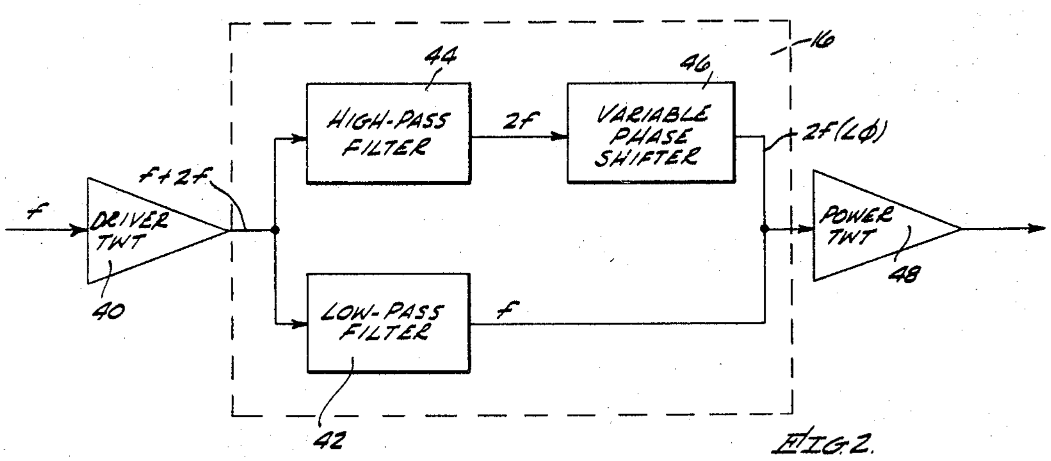
FIGS. 2–5 are block diagrams showing various specific embodiments of the present invention.
Figure 7:
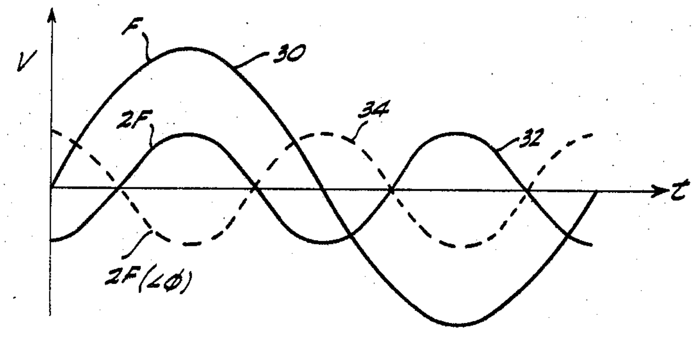
Figure 8:
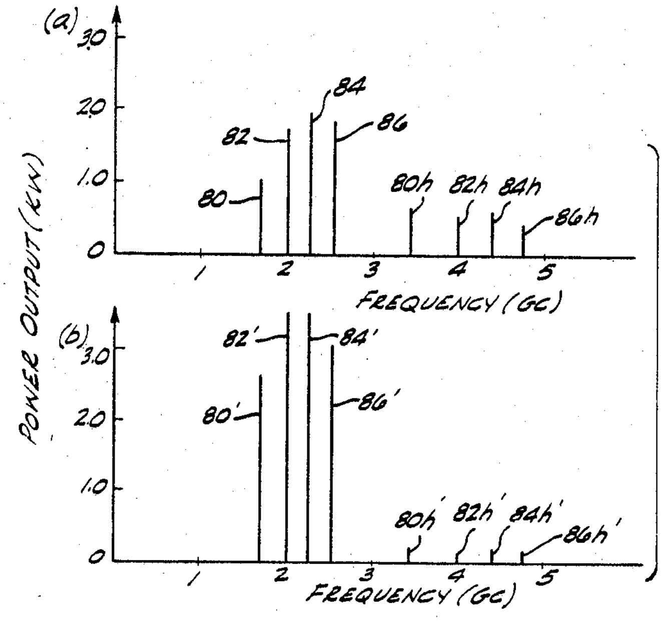
Figure 9:
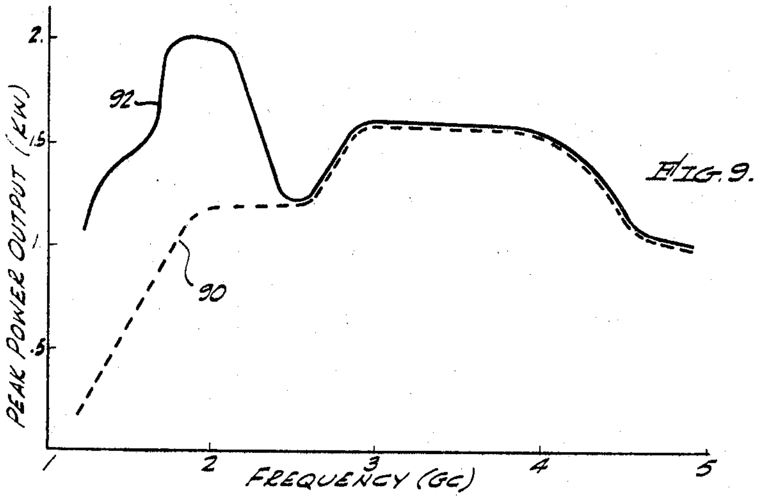

FIGS. 6*a* and *b* illustrate timing waveforms for an exemplary phase relationship between harmonically related signals at the input and output, respectively, of the harmonic signal conditioner of FIG. 1;

FIG. 7 shows timing waveforms of harmonically related signals in the vicinity of the output end of the amplification region of the traveling-wave tube of FIG. 1;

FIG. 8*a* is a graph illustrating the output power level from the system of FIG. 2 at various fundamental and second harmonic frequencies when the fundamental frequencies only are applied to the power traveling-wave tube;

FIG. 8*b* is a graph illustrating the output power level from the system of FIG. 2 at the same various fundamental and second harmonic frequencies when both the fundamental and the second harmonic frequencies are applied to the power traveling-wave tube in accordance with the principles of the present invention; and FIG. 9 is a graph illustrating the output power level from the system of FIG. 2 as a function of frequency when fundamental frequencies only are applied to the power traveling-wave tube and when both fundamental and second harmonic frequencies are applied to the power traveling-wave tube in accordance with the principles of the present invention.

Referring to FIG. 1 with greater particularity, the system of the present invention may be seen to include a harmonic generation device 10 to which input signals at a fundamental frequency $f$ are applied via a lead 12. The harmonic generation device 10 provides on its output lead 14 signals at the fundamental frequency $f$ and at the second harmonic frequency $2f$ of the fundamental frequency $f$. The harmonic generation device 10 may also generate higher harmonic signals at frequencies $3f$, $4f$ . . . $nf$, where $n$ is any integer. However, since the magnitude of the signal at the second harmonic frequency $2f$ is substantially greater than that of the signals at the higher harmonic frequencies, the following discussion is specifically concerned with treatment of the second harmonic frequency signals, although the principles of the present invention are also applicable to the higher harmonic frequencies.

The signals on the lead 14 are applied to a harmonic signal conditioner 16 which shifts the phase of the signal at the second harmonic frequency $2f$ by a predetermined angle $\varphi$ relative to the signal at the fundamental frequency $f$. The phase-shifted second harmonic output signal from the harmonic signal conditioner 16 is denoted by $2f(\angle\varphi)$ and, along with the fundamental frequency signal $f$, is applied via a lead 18 to a wide bandwidth traveling-wave tube 20.

Figure 6:
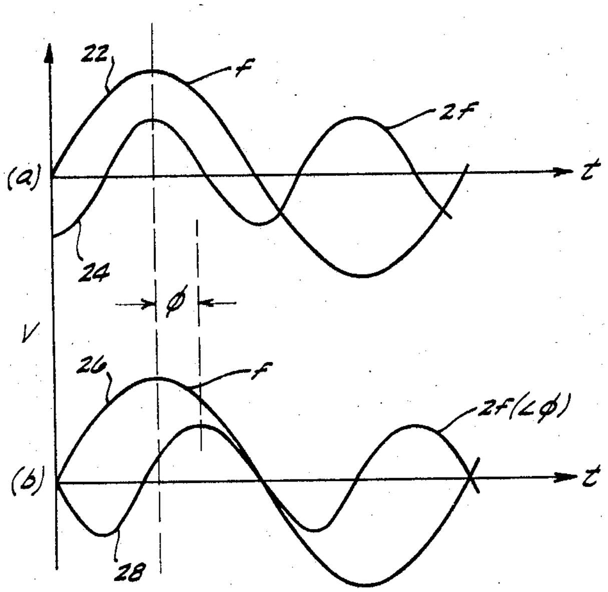

The function of the harmonic signal conditioner 16 may be better understood by making reference at this time to FIG. 6 which illustrates an exemplary phase-conditioning of the second harmonic signal $2f$. In FIG. 6*a* the input signals to the harmonic signal conditioner 16 at the frequencies $f$ and $2f$ are depicted by the curves 22 and 24, respectively. As may be seen from FIG. 6*b*, which illustrates the output signals from the harmonic signal conditioner 16, the signal at the fundamental frequency $f$, indicated by the curve 26, passes to the output of the harmonic signal conditioner 16 essentially unaffected; while the signal at the second harmonic frequency $2f$, depicted by the curve 28, is delayed by a phase angle $\varphi$. It should be apparent, of course, that the fundamental frequency signal $f$ and the harmonic frequency signal $2f$ may both experience a delay in passing through the signal conditioning device 16, in addition to a change in relative phase equal to the desired amount $\varphi$ which occurs between the two signals.

The amount of the phase shift $\varphi$ provided by the harmonic signal conditioner 16 is made such that the phase shifted second harmonic frequency signal $2f(\angle\varphi)$ applied to the traveling-wave tube 20 via the lead 18 will produce in the traveling-wave tube 20 a second harmonic frequency signal $2F(\angle\varphi)$ which essentially cancels the second harmonic frequency signal 2F generated in the traveling-wave tube 20 due to the fundamental frequency signal $f$ applied to the traveling-wave tube 20 on the lead 18. This effect is illustrated in FIG. 7 which portrays fundamental and harmonic signal components in the vicinity of the output end of the amplification region of the traveling-wave tube 20. In this figure the solid curve 30 depicts the amplified replica F of the fundamental frequency input signal $f$ on the lead 18; the solid curve 32 illustrates the second harmonic frequency signal 2F generated in the traveling-wave 20 due to the input signal $f$ on the lead 18; and the dashed curve 34 shows the amplified version $2F(\angle\varphi)$ of the phase conditioned second harmonic frequency signal $2f(\angle\varphi)$ on the lead 18. Thus, by phase conditioning the second harmonic input signal $2f(\angle\varphi)$ to the traveling-wave tube 20 so that it will produce in the traveling-wave tube 20 a second harmonic signal $2F(\angle\varphi)$ which substantially cancels the second harmonic signal 2F produced in the traveling-wave tube 20 due to the fundamental input signal $f$, a substantially reduced net second harmonic output is afforded at the output lead 36 from the traveling-wave tube 20.

It should be pointed out that while the desired amount of phase shift $\varphi$ afforded by the harmonic signal conditioner 16 in general is such as to cause the second harmonic frequency components in the power traveling-wave tube 20 to substantially cancel each other, the exact value of the phase shift $\varphi$ will be determined by the particular results to be emphasized in a given situation. For example, the phase shift $\varphi$ may be adjusted to a particular value which either maximizes the output power level from the traveling-wave tube 20 at the fundamental frequency, minimizes the output power level at the second harmonic frequency, or maximizes the ratio of the output power level at the fundamental frequency to the output power level at the second harmonic frequency.

In one embodiment of the present invention, illustrated in FIG. 2, the harmonic generation device 10 of FIG. 1 takes the form of a low level, or driver, traveling-wave tube 40 having at least an octave bandwidth. An example of a particular tube which may be used for the traveling-wave tube 40 is a traveling-wave tube amplifier No. 5–6868 manufactured by Alfred Electronics, Palo Alto, Calif. In the embodiment of FIG. 2 the harmonic signal conditioner 16, illustrated in dashed lines, comprises a first channel for passing signals at the fundamental frequency $f$ and a second channel for passing signals at the second harmonic frequency $2f$ and for shifting the phase of the second harmonic frequency signals by the desired amount $\varphi$ relative to the fundamental frequency signals. More specifically, output signals from the driver traveling-wave tube 40 at the fundamental frequency $f$ are fed to a low pass filter 42 having an upper cutoff frequency at approximately $1.5f$, for example; while output signals from the traveling-wave tube 40 at the second harmonic frequency $2f$ are sent through a high pass filter 44, which may have a lower cutoff frequency at approximately $1.5f$, for example, and a variable phase shifter 46. The phase shifter 46 may be a calibrated phase delay network such as a coaxial phase shifter Model 3752 manufactured by Narda Microwave Corporation, Plain View, N.Y. The output signals from the variable phase shifter 46 and from the low pass filter 42 are applied to a power traveling-wave tube 48, which may be a traveling-wave tube No. 518H manufactured by Hughes Aircraft Company, Microwave Tube Division, Los Angeles, Calif., for example.

As has been explained above, the variable phase shifter 46 shifts the phase of the signal at the second harmonic frequency $2f$ by a predetermined amount $\varphi$ relative to the signal at the fundamental frequency $f$ so that the phase shifted signal at $2f$ will generate a second harmonic signal component in the power traveling-wave tube 48 which substantially cancels the second harmonic signal component in the tube 48 developed from the fundamental frequency input signal $f$, thereby reducing the harmonic content of the output signals from the traveling-wave tube 48. It is pointed out that although the variable phase shifter 46 is illustrated in FIG. 2 as being located in the high pass filter channel so as to either retard or advance the phase of the second harmonic frequency signal by an angle $\varphi$, alternatively the phase shifter could be located in the low pass filter channel in order to respectively advance or retard the phase of the fundamental frequency signal by an angle $\varphi/2$.

Figure 3:
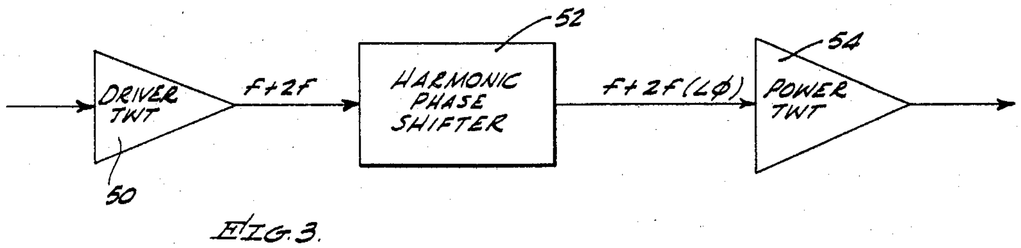

In the embodiment illustrated in FIG. 3, instead of processing the fundamental and second harmonic signals in separate channels, a single device to which both the fundamental and the second harmonic frequency signals are applied is employed to establish the desired phase relationship between the fundamental and the second harmonic frequency signals. In the system of FIG. 3 the harmonic generation device takes the form of a driver traveling-wave tube 50 such as the aforementioned Alfred Electronics traveling-wave tube amplifier No. 5–6868; the harmonic signal conditioner comprises a phase shifter 52 which may be an isolator PD1511 manufactured by Sylvania Electric Products Inc., Mountain View, Calif., or two cascaded LA–40N low pass filters manufactured by Microlabs Inc., Livingston, N.J.; and the power traveling-wave tube 54 may be the aforementioned Hughes Aircraft Company traveling-wave tube No. 518H.

Figure 4:
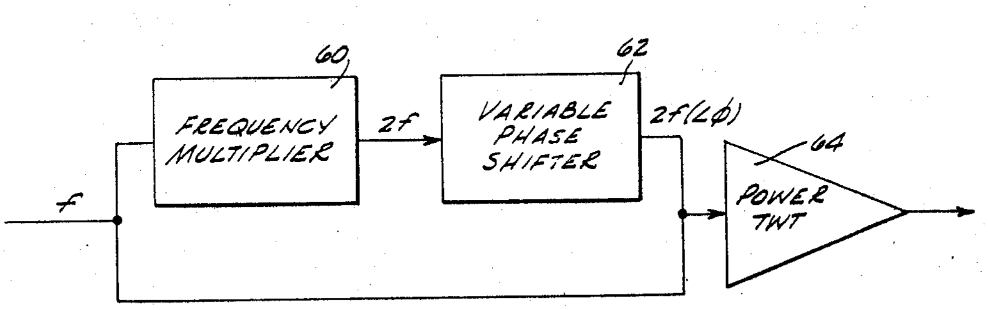

It is not necessary that a traveling-wave tube be employed to generate the harmonic signals to be phase conditioned; nor is it necessary that the fundamental frequency signal $f$ be amplified before being applied to the power traveling-wave tube. An embodiment of the present invention which does not utilize a low level traveling-wave tube to generate the second harmonic frequency signal is illustrated in FIG. 4. In the system of FIG. 4 the input signal at the fundamental frequency $f$ is applied to both a frequency multiplier 60 and a power traveling-wave tube 64. The frequency multiplier 60 may be a parametric frequency doubler of the type described in U.S. Patent 3,161,816 to Don R. Holcomb and assigned to Hughes Aircraft Company, Culver City, Calif.; while the power traveling-wave tube 64 may be the aforementioned Hughes 518H traveling-wave tube. The frequency multiplier 60 generates a signal at the second harmonic frequency $2f$ which, after passing through a variable phase shifter 62 such as the aforementioned Narda Model 3752 coaxial phase shifter, is applied to the power traveling-wave tube 64. The variable phase shifter 62 shifts the phase of the second harmonic frequency signal by an amount sufficient to cause the second harmonic frequency signal generated in the power traveling-wave tube 64 due to its second harmonic frequency input signal to substantially cancel the second harmonic frequency signal developed in the traveling-wave tube 64 due to its fundamental frequency input signal. It is pointed out that although the variable phase shifter 62 is illustrated in FIG. 4 as being coupled between the frequency multiplier 62 and the power traveling-wave tube 64; alternatively the phase shifter could be located in the fundamental frequency channel, with the output from the frequency multiplier 60 applied directly to the traveling-wave tube 64.

Figure 5:
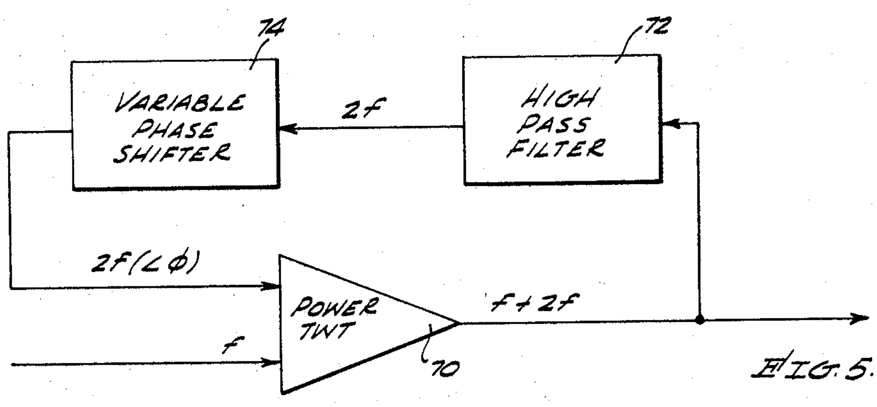

In another embodiment of the present invention the power traveling-wave tube itself is employed as the harmonic generation device, and the harmonic signal conditioner is located in a feedback path around the power traveling-wave tube. In this embodiment, which is illustrated in FIG. 5, the input signal at the fundamental frequency $f$ is applied directly to a power traveling-wave tube 70 which may be the aforementioned Hughes 518H traveling-wave tube. A high pass filter 72, which may be designed to have a lower cut-off frequency at approximately $1.5f$ for example, is coupled to the output from the power traveling-wave tube 70 in order to pass output signals from the traveling-wave tube 70 at the second harmonic frequency $2f$. The second harmonic frequency signals passing through the high pass filter 72 are applied to a variable phase shifter 74, which may be the aforementioned Narda Model 3752 coaxial phase shifter, in order to shift the phase of the second harmonic frequency signals by the desired amount $\varphi$. The phase shifted output signals from the variable phase shifter 74 are fed back to the input to the power traveling-wave tube 70.

By employing a system in accordance with the principles of the present invention, the output from the power traveling-wave tube at the fundamental frequency is substantially increased while the output at the second harmonic frequency is substantially reduced, thereby vastly increasing the tube efficiency, as well as improving the spectral purity and reducing the harmonic distortion of the output signal from the traveling-wave tube. These results may be better appreciated by making reference to the curves illustrated in FIG. 8. Data for these curves was obtained by applying input signals at various fundamental frequencies and at a power level of 1.58 watts to a system constructed in accordance with FIG. 2 and having the aforedescribed exemplary components. For the curves of FIG. 8*a* the variable phase shifter 46 was disconnected from the power traveling-wave tube 48 so that only the fundamental frequency signal $f$ was applied to the traveling-wave tube 48. In FIG. 8*a* the lines 80 and **80*h*** illustrate the power output at the fundamental frequency and at the second harmonic frequency, respectively, for an input signal frequency of 1.7 G*c*; the lines 82 and **82*h*** portray the power output at the fundamental and the second harmonic frequencies, respectively, for an input signal frequency of 2.0 G*c*; the lines 84 and **84*h* illustrate the power output at the fundamental and the second harmonic frequencies, respectively, for an input signal frequency of 2.2 Gc; and the lines 86 and 86*h*** show the power output at the fundamental and the second harmonic frequencies, respectively, for an input signal frequency of 2.4 Gc.

The curves of FIG. 8*b* were made for input signals of the same power level and at the same frequencies as those from which the curves of FIG. 8*a* were made. However, for the curves of FIG. 8*b* the variable phase shifter 46 was connected to the input to the traveling-wave tube 48 so that both the fundamental frequency signal $f$ from the low pass filter 42 and the phase conditioned second harmonic frequency signal $2f(\angle\varphi)$ from the variable phase shifter 46 were applied to the traveling-wave tube 48. The power output at the various fundamental frequencies are illustrated by the respective lines 80′, 82′, 84′ and 86′; while the power output at the respective second harmonic frequencies corresponding to the aforementioned fundamental frequencies are shown by the lines **80*h*′, 82*h*′, 84*h*′ and 86*h*′**, respectively. It may be observed from FIG. 8 that the system of the present invention not only vastly increases the power output at the various fundamental frequencies, but it also substantially reduces the power output at the second harmonic frequencies.

The results of the present invention in substantially increasing the peak power output in the lower portion of the amplification band of a wide bandwidth traveling-wave amplifier are further illustrated in FIG. 9. Data for the curves of FIG. 9 was obtained from a system constructed according to FIG. 2 using the aforedescribed exemplary components. The dashed curve 90 of FIG. 9 illustrates the peak power output from the power traveling-wave tube 48 when 1 watt of input power was applied to the driver traveling-wave tube 40, with the variable phase shifter 46 disconnected from the power traveling-wave tube 48 so that only the fundamental frequency signal $f$ was applied to the traveling-wave tube 48. The solid curve 92 of FIG. 9 shows the peak power output from the traveling-wave tube 48 for a power input of 1 watt applied to the driver traveling-wave tube 40, but with the variable phase shifter 46 connected to the power traveling-wave tube 48 so that both the phase conditioned second harmonic frequency signal $2f(\angle\varphi)$ and the fundamental frequency signal $f$ were applied to the power traveling-wave tube 48.

It may be observed from FIG. 9 that the power output at the lower portion of the amplification band is substantially increased when the phase conditioned second harmonic signals are utilized in accordance with the principles of the present invention. Since a greater power output is afforded for the same amount of input power, it will be apparent that the present invention increases the efficiency of operation of a wide bandwidth traveling-wave tube. Moreover, since the second harmonic output signals from the driver traveling-wave tubes of FIGS. 2 and 3 are advantageously utilized, it is not necessary to design these traveling-wave tubes to provide a minimum harmonic power output.

In many instances it is desirable to simultaneously process a plurality of signals at different frequencies through a traveling-wave tube, and under conditions suitable for harmonic generation, intermodulation sideband products are also produced. For input signals at first and second fundamental frequencies $f_1$ and $f_2$, intermodulation distortion is normally defined as the ratio of the power level of the net undistorted output at frequencies $f_1$ and $f_2$ to the power level of the closest pair of sideband intermodulation product frequencies $2f_1-f_2$ and $2f_2-f_1$, although in theory a wider spectrum of intermodulation signals may exist at frequencies $nf_1 \pm mf_2$, where $n$ and $m$ are integers. Since the system of the present invention significantly reduces the level of the signals at the second harmonic frequencies $2f_1$ and $2f_2$, the present invention is also useful in reducing intermodulation distortion in a wide bandwidth traveling-wave tube during amplification of a plurality of different frequency signals.

It is pointed out that while the particular traveling-wave tube mentioned above as being suitable for the traveling-wave tube 20 has a continuous passband encompassing both the fundamental frequency and the second harmonic frequency, it is not necessary that a continuous passband tube be used; but rather, a tube having a fundamental passband encompassing the fundamental frequency and a separate higher order passband encompassing the harmonic frequency may equally well be employed. In addition, although the amount of phase shift $\varphi$ afforded by the harmonic signal conditioner 16 has been described as being such as to cause the second harmonic frequency signals to substantially cancel in the traveling-wave tube 20, by adjusting the phase shift $\varphi$ so that the second harmonic frequency signals enhance each other in the traveling-wave tube 20, the principles of the present invention could be utilized to afford a high power microwave frequency doubler. Moreover, while the foregoing discussion has emphasized utilization of second harmonic frequency signals, the principles of the present invention are also applicable to signals at higher harmonic frequencies.

Thus, although the present invention has been shown and described with respect to particular embodiments, nevertheless various changes and modifications obvious to a person skilled in the art to which the invention pertains are deemed to lie within the spirit, scope and contemplation of the invention as set forth in the appended claims.

What is claimed is:

1. A microwave amplification system comprising: a traveling-wave amplifier capable of amplifying signals at a fundamental frequency and at a harmonic frequency of said fundamental frequency, means for applying to said traveling-wave amplifier a first signal at said fundamental frequency, and signal conditioning means for developing and applying to said traveling-wave amplifier a second signal at said harmonic frequency and having a phase related to that of said first signal such that an output signal component at said harmonic frequency is developed by said traveling-wave amplifier due to said second signal which substantially cancels the output signal component at said harmonic frequency developed by said traveling-wave amplifier due to said first signal.

2. A microwave amplification system comprising: means for generating from an input signal at a fundamental frequency a signal at a harmonic frequency of said fundamental frequency, a traveling-wave amplifier capable of amplifying signals at said fundamental frequency and at said harmonic frequency, and signal conditioning means for establishing a desired phase relationship between said harmonic frequency signal and said fundamental frequency signal and for applying the phase conditioned signals at said fundamental frequency and said harmonic frequency to said traveling-wave amplifier, said desired phase relationship being such that an output signal component at said harmonic frequency is developed by said traveling-wave amplifier due to its harmonic frequency input signal which substantially cancels the output signal component at said harmonic frequency developed by said traveling-wave amplifier due to its fundamental frequency input signal.

3. A microwave amplification system comprising: means for generating from an input signal at a fundamental frequency a signal at a harmonic frequency of said fundamental frequency, a travleing-wave amplifier capable of amplifying signals at said fundamental frequency and at said harmonic frequency, and signal conditioning means for establishing a desired phase relationship between said harmonic frequency signal and said fundamental frequency signal and for applying the phase conditioned signals at said fundamental frequency and said harmonic frequency to said traveling-wave amplifier, said desired phase relationship being such that the output power level from said traveling-wave amplifier at said fundamental frequency is maximized.

4. A microwave amplification system comprising: means for generating from an input signal at a fundamental frequency a signal at a harmonic frequency of said fundamental frequency, a traveling-wave amplifier capable of amplifying signals at said fundamental frequency and at said harmonic frequency, and signal conditioning means for establishing a desired phase relationship between said harmonic frequency signal and said fundamental frequency signal and for applying the phase conditioned signals at said fundamental frequency and said harmonic frequency to said traveling-wave amplifier, said desired phase relationship being such that the output power level from said traveling-wave amplifier at said harmonic frequency is minimized.

5. A microwave amplification system comprising: means for generating from an input signal at a fundamental frequency a signal at a harmonic frequency of said fundamental frequency, a traveling-wave amplifier capable of amplifying signals at said fundamental frequency and at said harmonic frequency, and signal conditioning means for establishing a desired phase relationship between said harmonic frequency signal and said fundamental frequency signal and for applying the phase conditioned signals at said fundamental frequency and said harmonic frequency to said traveling-wave amplifier, said desired phase relationship being such that the ratio of the output power level from said traveling-wave amplifier at said fundamental frequency to the output power level at said harmonic frequency is maximized.

6. A microwave amplification system comprising: a traveling-wave amplifier capable of amplifying signals at a selected frequency and at a frequency equal to twice said selected frequency, means for applying to said traveling-wave amplifier a first signal at said selected frequency, and signal conditioning means for developing and applying to said traveling-wave amplifier a second signal at twice said selected frequency and having a phase related to that of said first signal such that an output signal component at twice said selected frequency is developed by said traveling-wave amplifier due to said second signal which substantially cancels the output signal component at twice said selected frequency developed by said traveling-wave amplifier due to said first signal.

7. A microwave amplification system comprising: a traveling-wave amplifier capable of amplifying signals at a selected frequency and at a frequency equal to twice said selected frequency, means for applying to said traveling-wave amplifier a first signal at said selected frequency, and signal conditioning means for developing and applying to said traveling-wave amplifier a second signal at twice said selected frequency and having a phase related to that of said first signal such that the output power level from said traveling-wave amplifier at said selected frequency is maximized.

8. A microwave amplification system comprising: a traveling-wave amplifier capable of amplifying signals at a selected frequency and at a frequency equal to twice said selected frequency, means for applying to said traveling-wave amplifier a first signal at said selected frequency, and signal conditioning means for developing and applying to said traveling-wave amplifier a second signal at twice said selected frequency and having a phase related to that of said first signal such that the output power level from said traveling-wave amplifier at twice said selected frequency is minimized.

9. A microwave amplification system comprising: a traveling-wave amplifier capable of amplifying signals at a selected frequency and at a frequency equal to twice said selected frequency, means for applying to said traveling-wave amplifier a first signal at said selected frequency, and signal conditioning means for developing and applying to said traveling-wave amplifier a second signal at twice said selected frequency and having a phase related to that of said first signal such that the ratio of the output power level from said traveling-wave amplifier at said selected frequency to the output power level at twice said selected frequency is maximized.

10. A microwave amplification system comprising: means for generating from a first signal at a first frequency a second signal at a second frequency equal to twice said first frequency, a traveling-wave amplifier capable of amplifying signals at both said first and second frequencies, and signal conditioning means for shifting the phase of said second signal relative to said first signal by a predetermined amount and for applying the phase conditioned signals at said first and second frequencies to said traveling-wave amplifier, said predetermined amount of phase shift being such that an output signal component at said second frequency is developed by said traveling-wave amplifier due to its input signal at said second frequency which substantially cancels the output signal component at said second frequency developed by said traveling-wave amplifier due to its input signal at said first frequency.

11. A microwave amplification system comprising: a first traveling-wave tube for producing from an input signal at a fundamental frequency a first signal at said fundamental frequency and a second signal at a harmonic frequency of said fundamental frequency, a second traveling-wave tube capable of amplifying signals at said fundamental frequency and at said harmonic frequency, a first signal processing channel coupled between the output of said first traveling-wave tube and the input to said second traveling-wave tube and being capable of passing signals at said harmonic frequency but not at said fundamental frequency, a second signal processing channel coupled between the output of said first traveling-wave tube and the input to said second traveling-wave tube and being capable of passing signals at said fundamental frequency but not at said harmonic frequency, and means in at least one of said first and second channels for adjusting the phase of the signals in said first and second channels relative to one another such that an output signal component at said harmonic frequency is developed by said second traveling-wave tube due to its input signal from said second channel which substantially cancels the output signal component at said harmonic frequency developed by said traveling-wave tube due to its input signal from said first channel.

12. A microwave amplification system comprising: a driver traveling-wave tube for producing from an input signal at a selected frequency a first signal at said selected frequency and a second signal at a frequency equal to twice said selected frequency, a power traveling-wave tube capable of amplifying signals at said selected frequency and at twice said selected frequency, a high pass filter having a lower cutoff frequency approximately equal to 1.5 times said selected frequency coupled to the output of said driver traveling-wave tube, a low pass filter having an upper cutoff frequency approximately equal to 1.5 times said selected frequency coupled between the output of said driver traveling-wave tube and the input to said power traveling-wave tube, and variable phase shifter means coupled between said high pass filter and the input to said power traveling-wave tube for shifting the phase of the signal from said high pass filter relative to the signal from said low pass filter such that an output signal component at twice said selected frequency is developed by said power traveling-wave tube due to its input signal from said variable phase shifter means which substantially cancels the output signal component at twice said selected frequency developed by said power traveling-wave tube due to its input signal from said low pass filter.

13. A microwave amplification system comprising: a first traveling-wave tube for producing from an input signal at a fundamental frequency a first signal at said fundamental frequency and a second signal at a harmonic frequency of said fundamental frequency, a second traveling-wave tube capable of amplifying signals at said fundamental frequency and at said harmonic frequency, and phase shifting means coupled between the output of said first traveling-wave tube and the input to said second traveling-wave tube for establishing a desired phase relationship between said first and second signals such that an output signal component at said harmonic frequency is developed by said second traveling-wave tube due to said second signal which substantially cancels the output signal component at said harmonic frequency developed by said second traveling-wave tube due to said first signal.

14. A microwave amplification system comprising: a driver traveling-wave tube for producing from an input signal at a selected frequency a first signal at said seletced frequency and a second signal at a frequency equal to twice said selected frequency, a power traveling-wave tube capable of amplifying signals at said selected frequency and at twice said selected frequency, and phase shifter means coupled between the output of said driver traveling-wave tube and the input to said power traveling-wave tube for shifting the phase of said second signal relative to said first signal by a predetermined amount and for applying the resultant phase related signals at said selected frequency and at twice said selected frequency to said power traveling-wave tube, said predetermined amount of phase shift being such that an output signal component at twice said selected frequency is developed by said power traveling-wave tube due to its input signal at twice said selected frequency which substantially cancels the output signal component at twice said selected frequency developed by said power traveling-wave tube due to its input signal at said selected frequency.

15. A microwave amplification system comprising: frequency multiplier means for generating from an input signal at a fundamental frequency a signal at a harmonic frequency of said fundamental frequency, a traveling-wave tube capable of amplifying signals at said fundamental frequency and at said harmonic frequency, variable phase shifter means for shifting the phase of one of said fundamental frequency signal and said harmonic frequency signal relative to the other to establish a desired phase relationship therebetween, and means for applying the phase conditioned signals at said fundamental frequency and said harmonic frequency to said traveling-wave tube, said desired phase relationship being such that an output signal component at said harmonic frequency is developed by said traveling-wave tube due to its harmonic frequency input signal which substantially cancels the output signal component at said harmonic frequency developed by said traveling-wave tube due to its fundamental frequency input signal.

16. A microwave amplification system comprising: frequency multiplier means for generating from an input signal at a selected frequency a signal at a frequency equal to twice said selected frequency, a power traveling-wave tube capable of amplifying signals at said selected frequency and at twice said selected frequency, means for applying said input signal to said traveling-wave tube, variable phase shifter means coupled between said frequency multiplier and said traveling-wave tube for shifting the phase of said signal at twice said selected frequency relative to said input signal by a predetermined amount such that an output signal component at twice said selected frequency is developed by said traveling-wave tube due to the phase shifted signal at twice said selected frequency which substantially cancels the output signal component at twice said selected frequency developed by said traveling-wave tube due to said input signal.

17. A microwave amplification system comprising: a traveling-wave tube capable of amplifying signals at a fundamental frequency and at a harmonic frequency of said fundamental frequency, means for applying an input signal at said fundamental frequency to said traveling-wave tube, a feedback path capable of passing signals at said harmonic frequency but not at said fundamental frequency coupled between the output and the input of said traveling-wave tube, and means in said feedback path for adjusting the phase of the signal in said feedback path relative to said input signal such that the output power level from said traveling-wave at said fundamental frequency is maximized.

18. A microwave amplification system comprising: a traveling-wave tube capable of amplifying signals at a fundamental frequency and at a harmonic frequency of said fundamental frequency, means for applying an input signal at said fundamental frequency to said traveling-wave tube, a feedback path capable of passing signals at said harmonic frequency but not at said fundamental frequency coupled between the output and the input of said traveling-wave tube, and means in said feedback path for adjusting the phase of the signal in said feedback path relative to said input signal such that the output power level from said traveling-wave tube at said harmonic frequency is minimized.

19. A microwave amplification system comprising: a power traveling-wave tube capable of amplifying signals at a selected frequency and at a frequency equal to twice said selected frequency, means for applying an input signal at said selected frequency to said traveling-wave tube, a high pass filter having a lower cutoff frequency approximately equal to 1.5 times said selected frequency coupled to the output of said traveling-wave tube, and variable phase shifter means coupled between said high pass filter and the input to said traveling-wave tube for shifting the phase of the signal from said high pass filter relative to said input signal such that the output power level from said traveling-wave tube at said selected frequency is maximized.

20. A microwave amplification system comprising: a power traveling-wave tube capable of amplifying signals at a selected frequency and at a frequency equal to twice said selected frequency, means for applying an input signal at said selected frequency to said traveling-wave tube, a high pass filter having a lower cutoff frequency approximately equal to 1.5 times said selected frequency coupled to the output of said traveling-wave tube, and variable phase shifter means coupled between said high pass filter and the input to said traveling-wave tube for shifting the phase of the signal from said high pass filter relative to said input signal such that the output power level from said traveling-wave at twice said selected frequency is minimized.

References Cited

UNITED STATES PATENTS

| | | | |
|---|---|---|---|
| 1,894,656 | 1/1933 | Barohe | 328—240 X |
| 3,150,331 | 9/1964 | Rambo | 330—43 X |
| 3,202,928 | 8/1965 | Prior | 328—165 X |
| 3,253,231 | 5/1966 | Smith | 330—43 X |

NATHAN KAUFMAN, *Primary Examiner.*

U.S. Cl. X.R.

330—124, 157; 328—165